United States Patent
Clever et al.

(10) Patent No.: US 8,534,252 B2
(45) Date of Patent: Sep. 17, 2013

(54) CONCENTRIC CAMSHAFT WITH VARYING WALL GEOMETRY AND METHOD OF ASSEMBLY

(75) Inventors: Glenn E. Clever, Washington, MI (US); Frederick J. Rozario, Fenton, MI (US); Shekhar G. Wakade, Grand Blanc, MI (US); Joseph E. Robbins, Mayville, MI (US)

(73) Assignee: GM Global Technology Operations LLC

( * ) Notice: Subject to any disclaimer, the term of this patent is extended or adjusted under 35 U.S.C. 154(b) by 73 days.

(21) Appl. No.: 12/984,959

(22) Filed: Jan. 5, 2011

(65) Prior Publication Data

US 2011/0100310 A1    May 5, 2011

Related U.S. Application Data

(62) Division of application No. 12/100,770, filed on Apr. 10, 2008, now Pat. No. 7,966,983.

(51) Int. Cl.
*F01L 1/047* (2006.01)
*F01L 1/08* (2006.01)

(52) U.S. Cl.
USPC .................. 123/90.6; 29/888.1; 74/567

(58) Field of Classification Search
USPC ............ 123/90.6, 90.15, 90.17; 29/888.1; 74/567
See application file for complete search history.

(56) References Cited

U.S. PATENT DOCUMENTS

| | | | |
|---|---|---|---|
| 4,575,913 | A | 3/1986 | Sugiuchi et al. |
| 4,597,365 | A | 7/1986 | Madaffer |
| RE33,888 | E | 4/1992 | Hartnett et al. |
| 5,469,759 | A | 11/1995 | Orsini, Jr. |
| 5,664,463 | A * | 9/1997 | Amborn et al. ............... 74/567 |
| 5,992,017 | A | 11/1999 | Grafchev et al. |
| 6,182,362 | B1 | 2/2001 | Lancefield |
| 6,247,436 | B1 | 6/2001 | Lancefield et al. |
| 6,253,719 | B1 | 7/2001 | Methley |
| 6,615,468 | B2 | 9/2003 | Bloecker et al. |
| 6,725,817 | B2 | 4/2004 | Methley et al. |
| 6,725,818 | B2 | 4/2004 | Methley |
| 7,210,440 | B2 | 5/2007 | Lawrence et al. |
| 7,849,829 | B2 | 12/2010 | Clever et al. |
| 7,866,293 | B2 | 1/2011 | Clever et al. |

(Continued)

FOREIGN PATENT DOCUMENTS

| | | |
|---|---|---|
| EP | 1473443 A2 | 11/2004 |
| WO | 2006067519 A1 | 6/2006 |
| WO | 2006097767 A1 | 9/2006 |
| WO | 2007052075 A1 | 5/2007 |

*Primary Examiner* — Thomas Denion
*Assistant Examiner* — Daniel Bernstein
(74) *Attorney, Agent, or Firm* — Harness, Dickey & Pierce, P.L.C.

(57) ABSTRACT

A camshaft may include a first shaft, a first lobe member, and a second lobe member. The first shaft may include an annular wall defining a first bore. The wall may include a first portion having a first radial outer surface and a second portion having a second radial outer surface that is radially offset relative to the first radial outer surface. The first lobe member may define a second bore having the first portion of the first shaft located therein and frictionally engaged with the first shaft for rotation with the first shaft. The second lobe member may define a third bore having the second portion of the first shaft located therein. The second lobe member may be rotatably disposed on the second portion of the first shaft.

20 Claims, 7 Drawing Sheets

(56) References Cited

U.S. PATENT DOCUMENTS

| | | | |
|---|---|---|---|
| 2005/0226736 A1* | 10/2005 | Lancefield et al. ........... 417/213 |
| 2006/0185471 A1 | 8/2006 | Lawrence et al. |
| 2006/0207538 A1 | 9/2006 | Lancefield et al. |
| 2007/0119402 A1 | 5/2007 | Lancefield et al. |

* cited by examiner

CONCENTRIC CAMSHAFT WITH VARYING WALL GEOMETRY AND METHOD OF ASSEMBLY

CROSS-REFERENCE TO RELATED APPLICATIONS

This application is a divisional of U.S. patent application Ser. No. 12/100,770 filed on Apr. 10, 2008 (now U.S. Pat. No. 7,966,983, issued Jun. 28, 2011). The entire disclosure of the above application is incorporated herein by reference.

FIELD

The present disclosure relates to engine camshaft assemblies, and more specifically to concentric camshaft assemblies.

BACKGROUND

The statements in this section merely provide background information related to the present disclosure and may not constitute prior art.

Engines typically include a camshaft to actuate intake and exhaust valves. Some camshafts are concentric camshafts that provide for relative rotation between the intake and exhaust lobes. The intake lobes may be fixed to an outer shaft for rotation with the shaft and the exhaust lobes may be rotatably supported on the shaft. Alternatively, the exhaust lobes may be fixed to the outer shaft for rotation with the shaft and the intake lobes may be rotatably supported on the shaft. In either arrangement, the lobes that are rotatably supported on the shaft may use an outer surface of the outer shaft as a bearing surface. The use of the outer surface of the shaft as a bearing surface may require tighter tolerances for the outer diameter of the outer shaft, and therefore more cumbersome assembly processes that result in additional cost.

SUMMARY

A camshaft may include a first shaft, a first lobe member, and a second lobe member. The first shaft may include an annular wall defining a first bore. The wall may include a first portion having a first radial outer surface and a second portion having a second radial outer surface that is radially offset relative to the first radial outer surface. The first lobe member may define a second bore having the first portion of the first shaft located therein and frictionally engaged with the first shaft for rotation with the first shaft. The second lobe member may define a third bore having the second portion of the first shaft located therein. The second lobe member may be rotatably disposed on the second portion of the first shaft.

A method may include locating first and second lobe members of a camshaft on a first shaft and deforming the first shaft to fix the first lobe member to the first shaft. The first shaft may include an annular wall that defines a first bore and may include a first portion having first radial inner and outer surfaces and a second portion having second radial inner and outer surfaces. The locating of the first lobe member may include the first portion of the first shaft being located within a second bore of the first lobe member. The locating of the second lobe member on the first shaft may include the second portion of the first shaft being located within a third bore of the second lobe member. An outward radial force may be applied from within the first bore to displace the first radial inner surface radially outwardly relative to the second radial inner surface and the first radial outer surface radially outwardly relative to the second radial outer surface.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
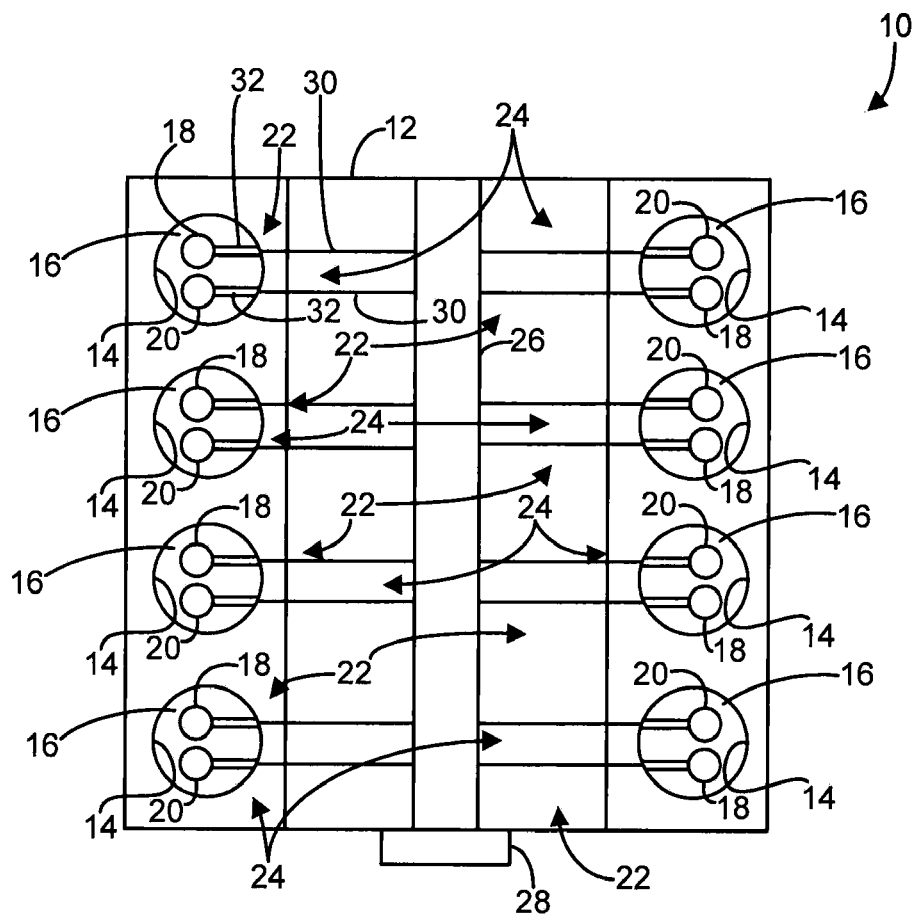
FIG. 1 is a schematic illustration of an engine assembly according to the present disclosure.

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary engine assembly 10 is schematically illustrated. The engine assembly 10 may include an engine 12 including a plurality of cylinders 14 having pistons 16 disposed therein. The engine 12 may further include an intake valve 18, an exhaust valve 20, and intake and exhaust valve lift mechanisms 22, 24 for each cylinder 14, as well as a camshaft 26 and a cam phaser 28.

The intake valve lift mechanism 22 may include a pushrod 30 and a rocker arm 32. The exhaust valve lift mechanism 24 may additionally include a pushrod 30 and a rocker arm 32. The camshaft 26 may be supported by an engine structure such as an engine block. Pushrods 30 may be engaged with the camshaft 26 to actuate the rocker arms 32 and may selectively open the intake and exhaust valves 18, 20. While the engine assembly 10 is illustrated as a pushrod engine, it is understood that the present disclosure may be applicable to a variety of other engine configurations as well, such as overhead cam engines, where the camshaft 26 is supported by a cylinder head.

Figure 2:
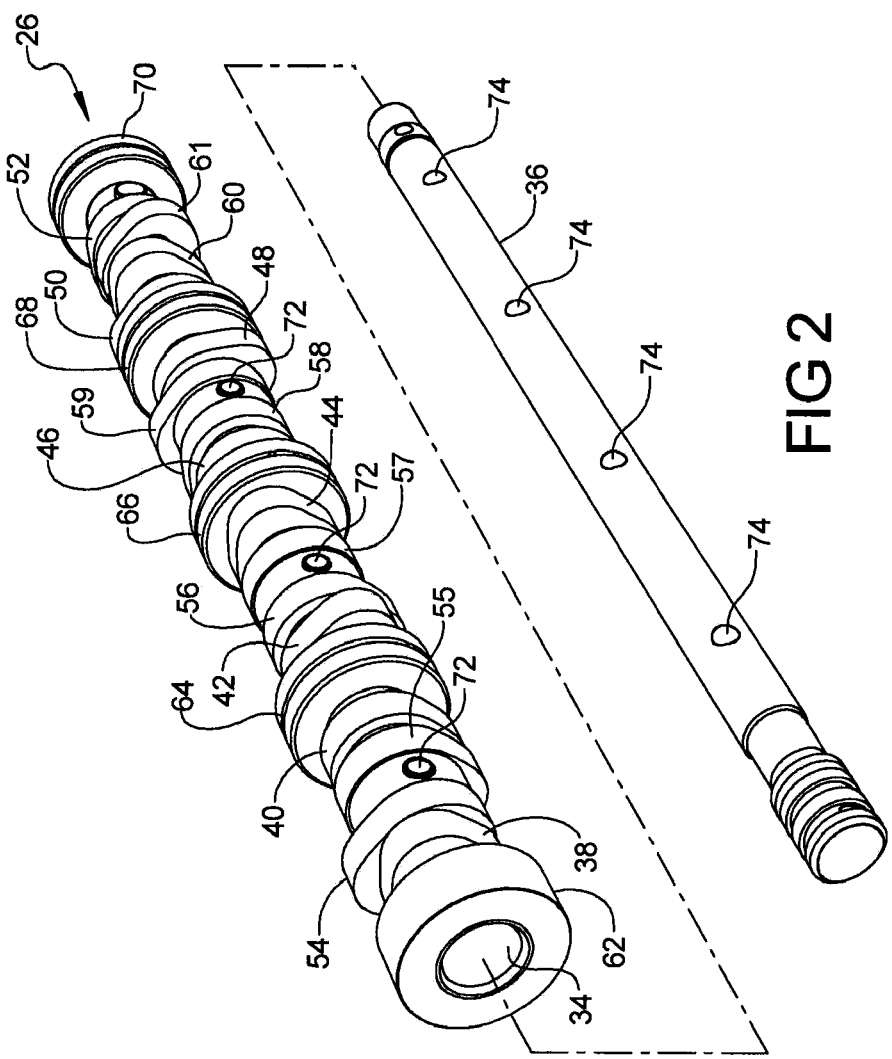
FIG. 2 is a perspective view of the camshaft of FIG. 1.

With reference to FIG. 2, the camshaft 26 may include first and second shafts 34, 36, a first set of lobe members 38, 40, 42, 44, 46, 48, 50, 52 a second set of lobe members 54, 55, 56, 57, 58, 59, 60, 61, bearing journals 62, 64, 66, 68, 70 and drive pins 72. In the present example, the first set of lobe members 38, 40, 42, 44, 46, 48, 50, 52 may form an intake lobe set and the second set of lobe members 54, 55, 56, 57, 58, 59, 60, 61 may form an exhaust lobe set. However, it is understood that alternate arrangements may be provided where the first set of lobe members 38, 40, 42, 44, 46, 48, 50, 52 may form an exhaust lobe set and the second set of lobe members 54, 55, 56, 57, 58, 59, 60, 61 may form an intake lobe set.

The second shaft 36 may be rotatably disposed within the first shaft 34. The first shaft 34 may include slots therethrough (not shown) and the second shaft 36 may include apertures 74 that receive the drive pins 72 therein and couple the second set of lobe members 54, 55, 56, 57, 58, 59, 60, 61 for rotation with the second shaft 36. The slots in the first shaft 34 may generally allow for a rotational travel of the pins 72 therein.

The first set of lobe members 38, 40, 42, 44, 46, 48, 50, 52 and the bearing journals 62, 64, 66, 68, 70 may be fixed for rotation with the first shaft 34. The engagement between the first set of lobe members 38, 40, 42, 44, 46, 48, 50, 52 and the first shaft 34 and the engagement between the bearing journals 62, 64, 66, 68, 70 and the first shaft 34 may include a friction fit engagement. The second set of lobe members 54, 55, 56, 57, 58, 59, 60, 61 may be disposed between adjacent ones of the first set of lobe members 38, 40, 42, 44, 46, 48, 50, 52.

The structure of the first shaft 34 at each of the lobe members 38, 40, 42, 44, 46, 48, 50, 52 and at each of the bearing journals 62, 64, 66, 68, 70 may be generally similar. Therefore, the structure of the first shaft 34 at the lobe member 38 and at the bearing journal 62, the structure of the lobe member 38 and the bearing journal 62, the engagement between the lobe member 38 and the first shaft 34, and the engagement between the bearing journal 62 and the first shaft 34 will be described with the understanding that the description applies equally to the lobe members 40, 42, 44, 46, 48, 50, 52 and the bearing journals 64, 66, 68, 70. The structure of the first shaft 34 at each of the lobe members 54, 55, 56, 57, 58, 59, 60, 61 may be also be generally similar. Therefore, the structure of the first shaft 34 at the lobe member 54, the structure of the lobe member 54, and the engagement between the lobe member 54 and the first shaft 34 will be described with the understanding that the description applies equally to the lobe members 55, 56, 57, 58, 59, 60, 61.

Figure 3:
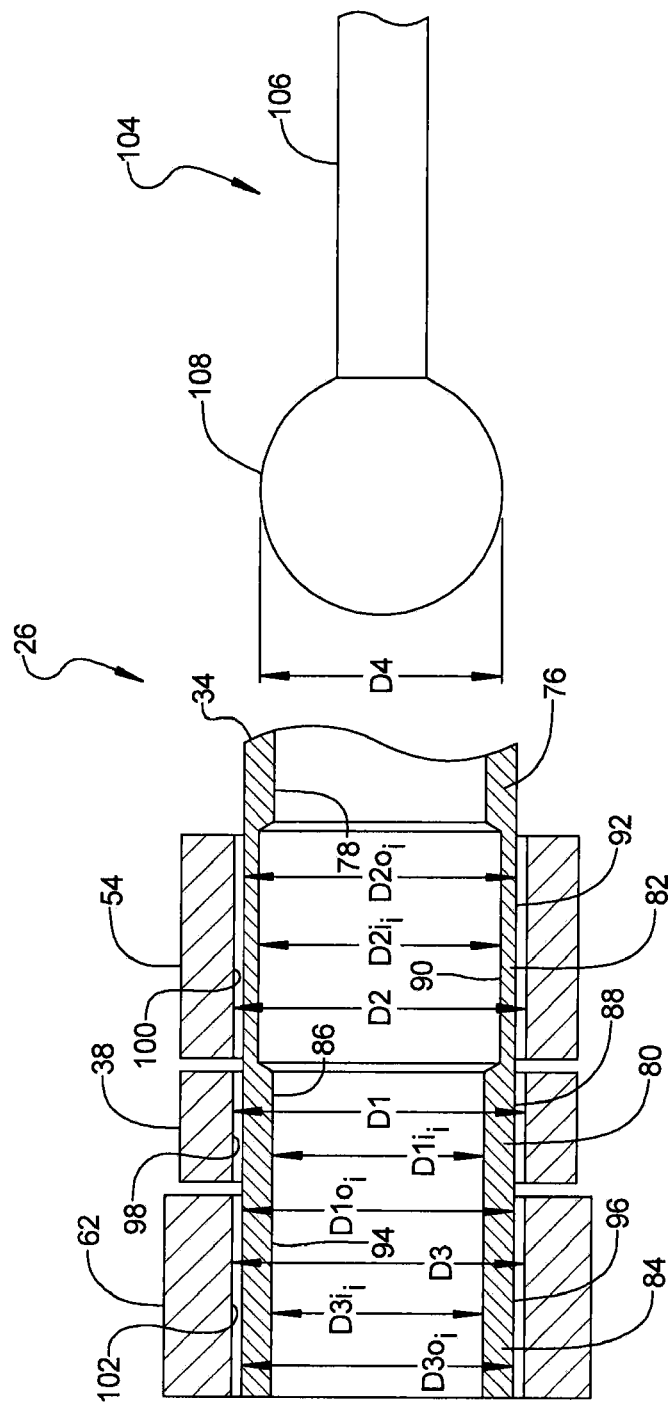
FIG. 3 is a fragmentary section view of the camshaft of FIG. 2 in a first state and a tool according to the present disclosure.

With additional reference to FIG. 3, the camshaft 26 is schematically illustrated in an initial state before the lobe member 38 and the bearing journal 62 are fixed for rotation with the first shaft 34. The first shaft 34 may include an annular wall 76 that defines a bore 78. The annular wall 76 may include first, second, and third portions 80, 82, 84. The first portion 80 may be axially aligned with the lobe member 38, the second portion 82 may be axially aligned with the lobe member 54, and the third portion 84 may be axially aligned with the bearing journal 62.

The first portion 80 may have a first radial inner surface 86 and a first radial outer surface 88. The second portion 82 may have a second radial inner surface 90 and a second radial outer surface 92. The third portion 84 may have a third radial inner surface 94 and a third radial outer surface 96. In the initial state, the first and third radial inner surfaces 86, 94 may be radially offset relative to the second radial inner surface 90.

In the present example, the second radial inner surface 90 may be offset radially outwardly relative to the first and third radial inner surfaces 86, 94. The outward radial extent of the first, second, and third radial outer surfaces 88, 92, 96 may be generally equal to one another. The lobe member 38 may have a bore 98 that has an outward radial extent that is greater than the initial outward radial extent of the first radial outer surface 88. The lobe member 54 may have a bore 100 that has an outward radial extent that is greater than the initial outward radial extent of the second radial outer surface 92. The journal bearing 62 may have a bore 102 that has an outward radial extent that is greater than the initial outward radial extent of the third radial outer surface 96.

For example, the first portion 80 may have an initial inner diameter ($D1_i$) and an initial outer diameter ($D1_o$) defining a first wall thickness ($T_1$) for the first portion 80. The second portion 82 may have an initial inner diameter ($D2_i$) and an initial outer diameter ($D2_o$) defining a second wall thickness ($T_2$) for the second portion 82. The third portion 84 may have an initial inner diameter ($D3_i$) and an initial outer diameter ($D3_o$) defining a third wall thickness ($T_3$) for the third portion 84. The first wall thickness ($T_1$) and the third wall thickness ($T_3$) may be greater than the second wall thickness ($T_2$). The bore 98 of the lobe member 38 may have a first diameter (D1) that is greater than the initial outer diameter ($D1_o$) of the first portion 80 forming a first clearance ($C_1$) between the first shaft 34 and the lobe member 38. The bore 100 of the lobe member 54 may have a second diameter (D2) that is greater than the initial outer diameter ($D2_o$) of the second portion 82 forming a second clearance ($C_2$) between the first shaft 34 and the lobe member 54. The bore 102 of the journal bearing 62 may have a third diameter (D3) that is greater than the initial outer diameter ($D3_o$) of the third portion 84 forming a third clearance ($C_3$) between the first shaft 34 and the bearing journal 62.

FIG. 3 additionally illustrates a tool 104 that deforms the first shaft 34. The tool 104 may include a shaft 106 and a deforming member 108. The deforming member 108 may have an outward radial extent that is greater than an initial outward radial extent of the first and third radial inner surfaces 86, 94 and that is less than the outward radial extent of the third radial inner surface 90. In the present example, the deforming member 108 may be a spherical member that has a diameter (D4) that is greater than the first and third initial inner diameters ($D1_i$, $D3_i$) and that is less than the second initial inner diameter ($D2_i$).

During assembly of the camshaft 26, the lobe member 54 may be located on the second portion 82 of the first shaft 34, the lobe member 38 may be located on the first portion 80 of the first shaft 34, and the bearing journal 64 may be located on the third portion 84 of the first shaft 34. The deforming member 108 of the tool 104 may be forced through the bore 78 of the first shaft 34 to create a frictional engagement (or interference fit) between the lobe member 38 and the first shaft 34 and between the bearing journal 62 and the first shaft 34. More specifically, the displacement of the deforming member 108 through the bore 78 may generally eliminate the first clearance ($C_1$) and the third clearance ($C_3$), while maintaining the second clearance ($C_2$) due to the relationship between the diameter (D4) of the tool 104 and the first, second, and third initial inner diameters ($D1_i$, $D2_i$, $D3_i$).

Figure 4:
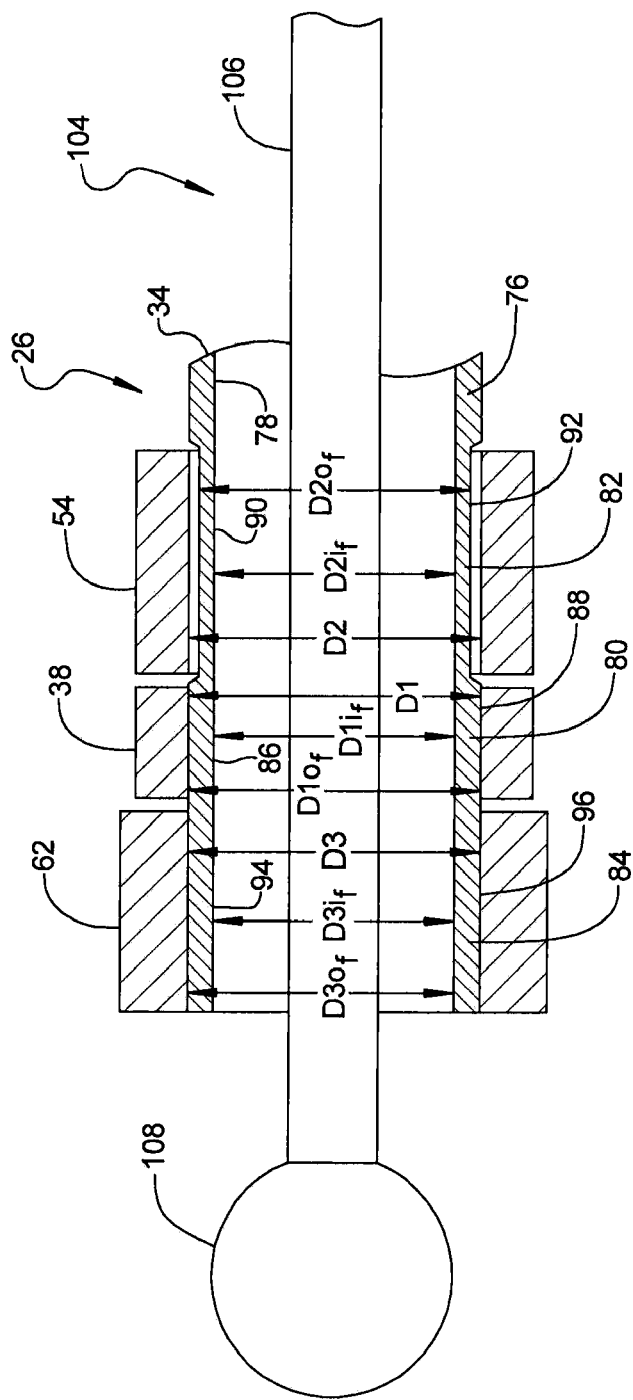
FIG. 4 is a fragmentary section view of the camshaft and tool of FIG. 3 in a second state.

With additional reference to FIG. 4, the camshaft 26 is schematically illustrated in a final state where the lobe member 38 and the bearing journal 64 are fixed for rotation with the first shaft 34. In the final state, the first radial outer surface 88 of the first shaft 34 and the third radial outer surface 96 of the first shaft 34 may each have an outward radial extent that is greater than an outward radial extent of the second radial outer surface 92 of the first shaft 34. The outward radial extent of the first radial outer surface 88 may be generally similar to the outward radial extent of the bore 98 of the lobe member 38 and the outward radial extent of the third radial outer surface 96 may be generally similar to the outer radial extent of the bore 102 of the bearing journal 62. Therefore, the lobe member 38 may be frictionally engaged with the first portion 80 of the first shaft 34 and the bearing journal 62 may be frictionally engaged with the third portion 84 of the first shaft 34.

For example, the first portion 80 may have a final inner diameter ($D1_f$) and a final outer diameter ($D1_o$), the second portion 82 may have a final inner diameter ($D2_f$) and a final outer diameter ($D2_o$), and the third portion 84 may have a final inner diameter ($D3_f$) and a final outer diameter ($D3_o$).

The bore 98 of the lobe member 38 may have a first diameter (D1) that is approximately equal to the final outer diameter (D1$o_f$) of the first portion 80 frictionally locking the lobe member 38 for rotation with the first shaft 34. The bore 100 of the lobe member 54 may have a second diameter (D2) that is greater than the final outer diameter (D2$o_f$) of the second portion 82. The final outer diameter (D2$o_f$) of the second portion 82 may be approximately equal to the initial outer diameter (D2$o_i$) of the second portion 82, maintaining the second clearance (C$_2$) between the first shaft 34 and the lobe member 54. The bore 102 of the journal bearing 62 may have a third diameter (D3) that is approximately equal to the final outer diameter (D3$o_f$) of the third portion 84, frictionally locking the bearing journal 62 for rotation with the first shaft 34. The final inner diameter (D1$i_f$) of the first portion and the final inner diameter (D3$i_f$) of the third portion may be generally equal to the diameter of the deforming member 108.

Figure 5:
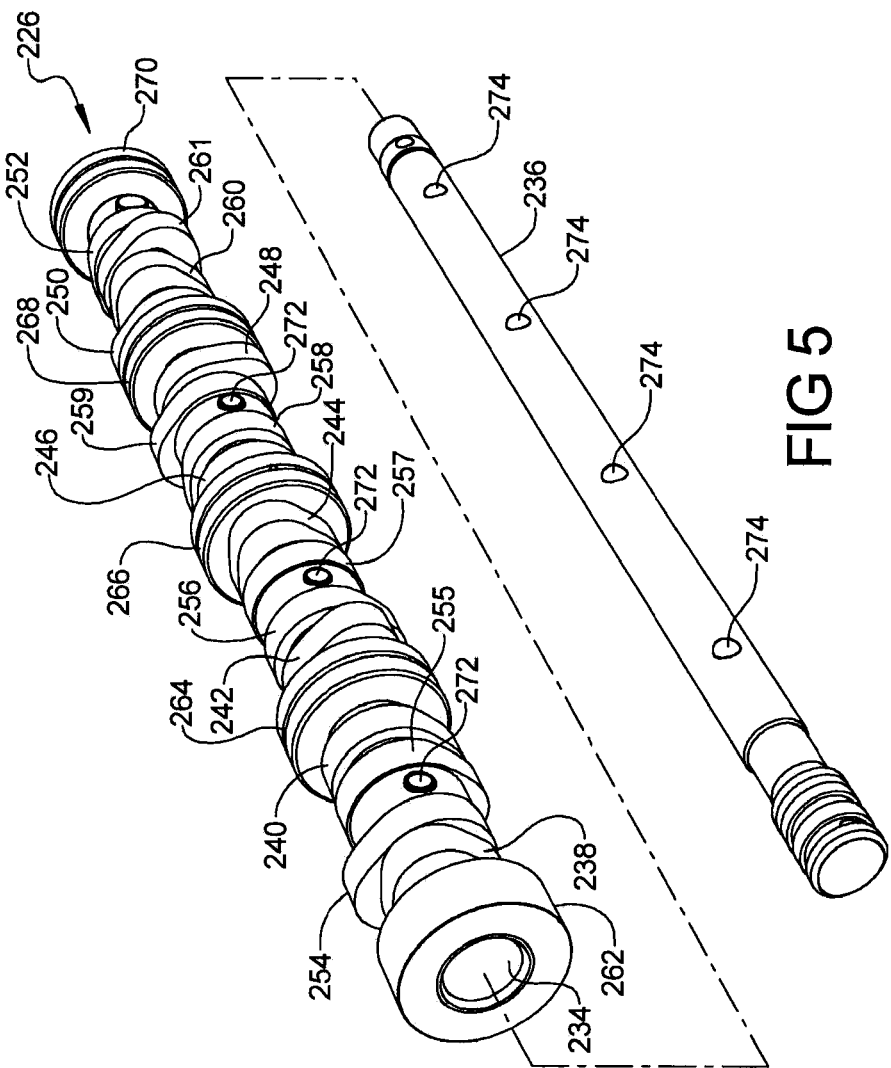
FIG. 5 is a perspective view of an alternate camshaft according to the present disclosure.
Figure 6:
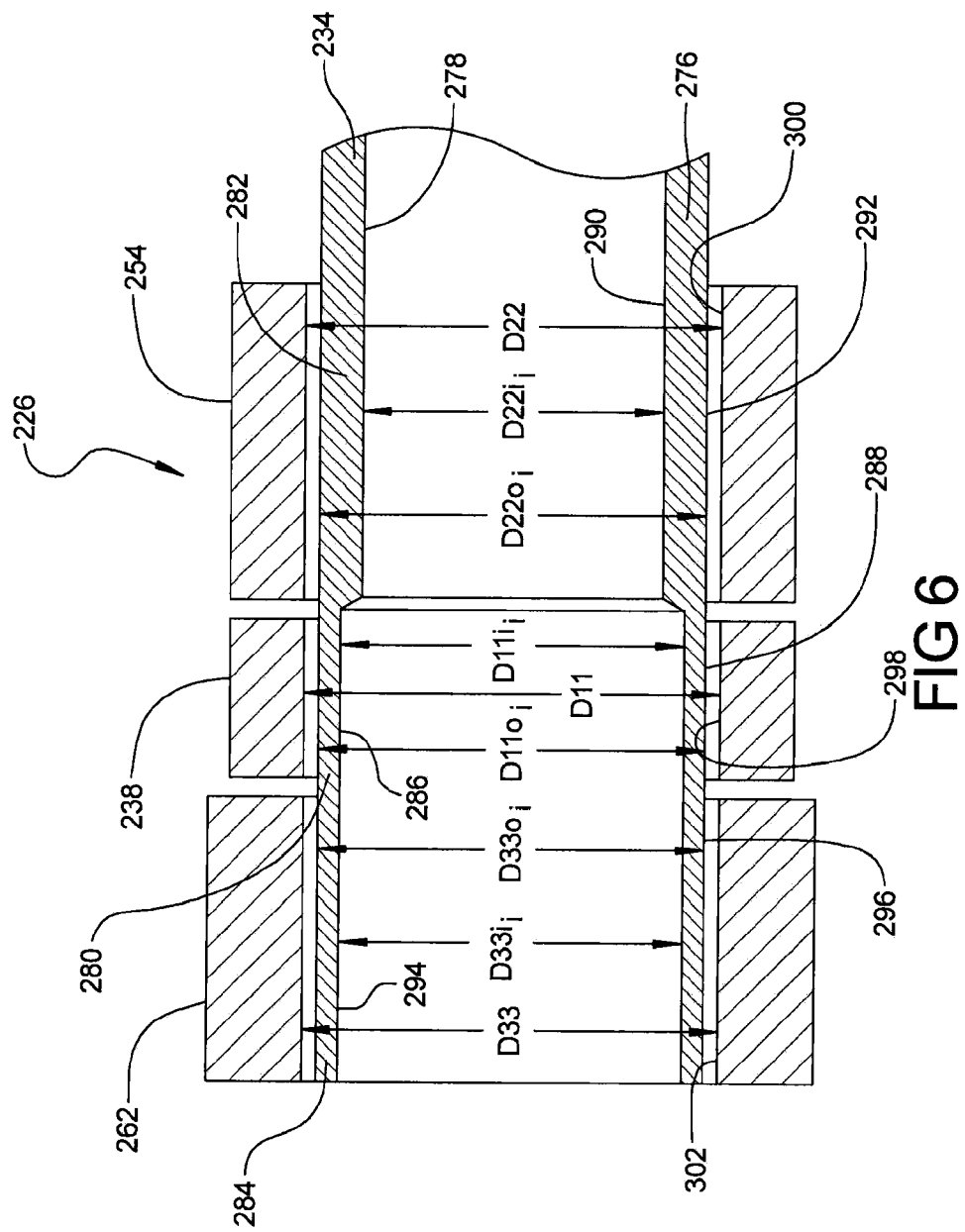
FIG. 6 is a fragmentary section view of the camshaft of FIG. 5 in a first state.
Figure 7:
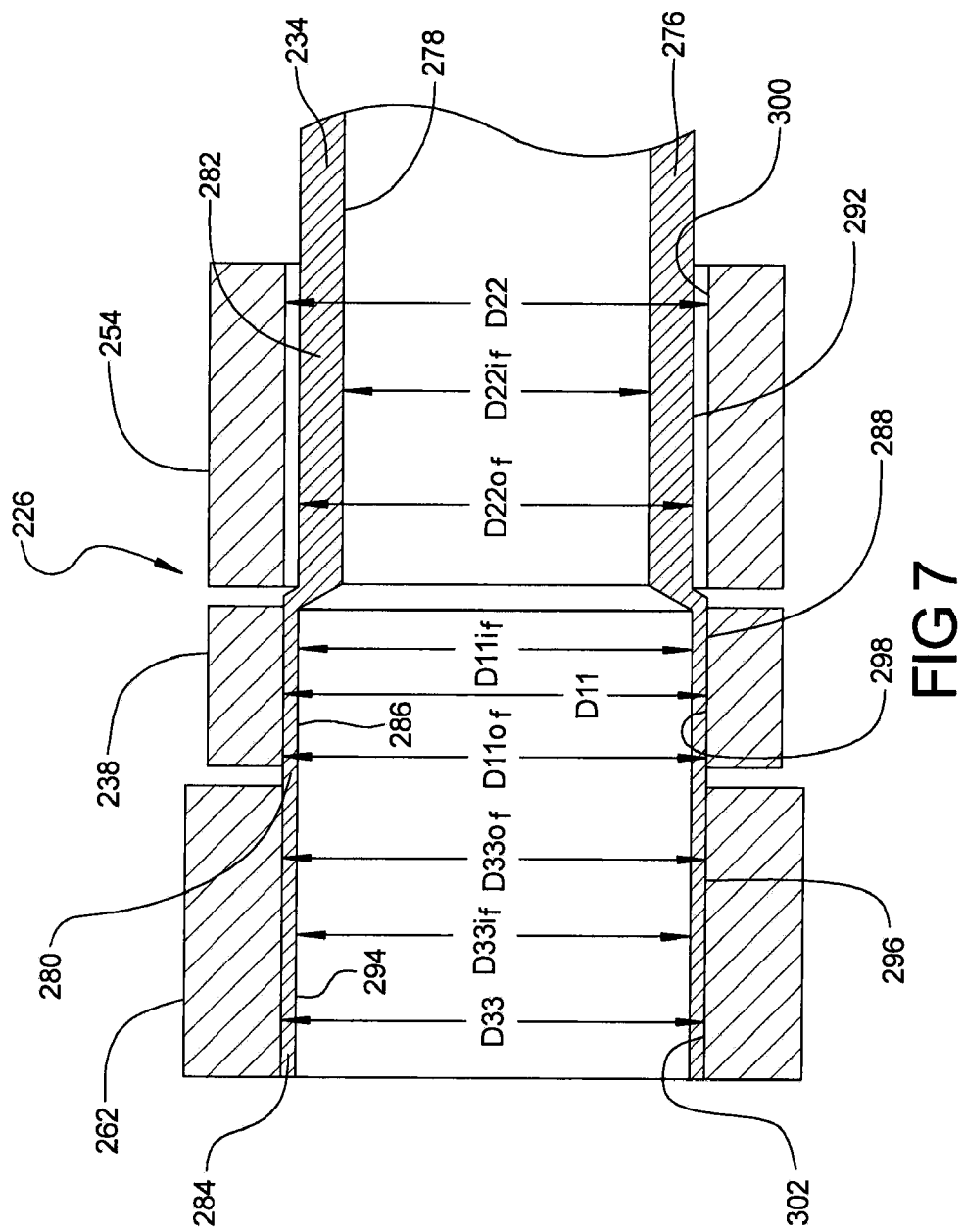
FIG. 7 is a fragmentary section view of the camshaft of FIG. 5 in a second state.

Referring now to FIGS. 5-7, an alternate camshaft 226 is shown. The camshaft 226 may be incorporated into an engine assembly similar to the engine assembly 10 and may function similar to the camshaft 26. The camshaft 226 may include first and second shafts 234, 236, a first set of lobe members 238, 240, 242, 244, 246, 248, 250, 252 a second set of lobe members 254, 255, 256, 257, 258, 259, 260, 261, bearing journals 262, 264, 266, 268, 270 and drive pins 272. In the present example, the first set of lobe members 238, 240, 242, 244, 246, 248, 250, 252 may form an intake lobe set and the second set of lobe members 254, 255, 256, 257, 258, 259, 260, 261 may form an exhaust lobe set. However, it is understood that alternate arrangements may be provided where the first set of lobe members 238, 240, 242, 244, 246, 248, 250, 252 may form an exhaust lobe set and the second set of lobe members 254, 255, 256, 257, 258, 259, 260, 261 may form an intake lobe set.

The second shaft 236 may be rotatably disposed within the first shaft 234. The first shaft 234 may include slots therethrough (not shown) and the second shaft 236 may include apertures 274 that receive the drive pins 272 therein and couple the second set of lobe members 254, 255, 256, 257, 258, 259, 260, 261 for rotation with the second shaft 236. The slots in the first shaft 234 may generally allow for a rotational travel of the pins 272 therein.

The first set of lobe members 238, 240, 242, 244, 246, 248, 250, 252 and the bearing journals 262, 264, 266, 268, 270 may be fixed for rotation with the first shaft 234. The engagement between the first set of lobe members 238, 240, 242, 244, 246, 248, 250, 252 and the first shaft 234 and the engagement between the bearing journals 262, 264, 266, 268, 270 and the first shaft 234 may include a friction fit engagement. The second set of lobe members 254, 255, 256, 257, 258, 259, 260, 261 may be disposed between adjacent ones of the first set of lobe members 238, 240, 242, 244, 246, 248, 250, 252.

The structure of the first shaft 234 at each of the lobe members 238, 240, 242, 244, 246, 248, 250, 252 and at each of the bearing journals 262, 264, 266, 268, 270 may be generally similar. Therefore, the structure of the first shaft 234 at the lobe member 238 and at the bearing journal 262, the structure of the lobe member 238 and the bearing journal 262, the engagement between the lobe member 238 and the first shaft 234, and the engagement between the bearing journal 262 and the first shaft 234 will be described with the understanding that the description applies equally to the lobe members 240, 242, 244, 246, 248, 250, 252 and the bearing journals 264, 266, 268, 270. The structure of the first shaft 234 at each of the lobe members 254, 255, 256, 257, 258, 259, 260, 261 may be also be generally similar. Therefore, the structure of the first shaft 234 at the lobe member 254, the structure of the lobe member 254, and the engagement between the lobe member 254 and the first shaft 234 will be described with the understanding that the description applies equally to the lobe members 255, 256, 257, 258, 259, 260, 261.

With reference to FIG. 6, the camshaft 226 is shown in an initial state before the first set of lobe members 238 and the bearing journals 262 are fixed for rotation with the first shaft 234. The first shaft 234 may include an annular wall 276 that defines a bore 278. The annular wall 276 may include first, second, and third portions 280, 282, 284. The first portion 280 may be axially aligned with the lobe member 238, the second portion 282 may be axially aligned with the lobe member 254, and the third portion 284 may be axially aligned with the bearing journal 262.

The first portion 280 may have a first radial inner surface 286 and a first radial outer surface 288. The second portion 282 may have a second radial inner surface 290 and a second radial outer surface 292. The third portion 284 may have a third radial inner surface 294 and a third radial outer surface 296. In the initial state, the first and third radial inner surfaces 286, 294 may be radially offset relative to the second radial inner surface 290.

In the present example, the second radial inner surface 290 may be offset radially inwardly relative to the first and third radial inner surfaces 286, 294. The outward radial extent of the first, second, and third radial outer surfaces 288, 292, 296 may be generally equal to one another. The lobe member 238 may have a bore 298 that has an outward radial extent that is greater than the initial outward radial extent of the first radial outer surface 288. The lobe member 254 may have a bore 300 that has an outward radial extent that is greater than the initial outward radial extent of the second radial outer surface 292. The journal bearing 262 may have a bore 302 that has an outward radial extent that is greater than the initial outward radial extent of the third radial outer surface 296.

For example, the first portion 280 may have an initial inner diameter (D11$i_i$) and an initial outer diameter (D11$o_i$) defining a first wall thickness (T$_{11}$) for the first portion 280. The second portion 282 may have an initial inner diameter (D22$i_i$) and an initial outer diameter (D22$o_i$) defining a second wall thickness (T$_{22}$) for the second portion 282. The third portion 284 may have an initial inner diameter (D33$i_i$) and an initial outer diameter (D33$o_i$) defining a third wall thickness (T$_{33}$) for the third portion 284. The first wall thickness (T$_{11}$) and the third wall thickness (T$_{33}$) may be less than the second wall thickness (T$_{22}$). The bore 298 of the lobe member 238 may have a first diameter (D11) that is greater than the initial outer diameter (D11$o_i$) of the first portion 280 forming a first clearance (C$_{11}$) between the first shaft 234 and the lobe member 238. The bore 300 of the lobe member 254 may have a second diameter (D22) that is greater than the initial outer diameter (D22$o_i$) of the second portion 282 forming a second clearance (C$_{22}$) between the first shaft 234 and the lobe member 254. The bore 302 of the journal bearing 262 may have a third diameter (D33) that is greater than the initial outer diameter (D33$o_i$) of the third portion 284 forming a third clearance (C$_{33}$) between the first shaft 234 and the bearing journal 262.

During assembly of the camshaft 226, the lobe member 254 may be located on the second portion 282 of the first shaft 234, the lobe member 238 may be located on the first portion 280 of the first shaft 234, and the bearing journal 264 may be located on the third portion 284 of the first shaft 234. A pressurized fluid may be supplied within the bore 278 of the first shaft 234 to create a frictional engagement (or interference fit) between the lobe member 238 and the first shaft 234 and between the bearing journal 262 and the first shaft 234. More specifically, the pressurized fluid within the bore 278 may generally eliminate the first clearance ($C_1$) and the third clearance ($C_3$), while maintaining the second clearance ($C_2$) due to the greater wall thickness ($T_{22}$) of the second portion 282 of the first shaft 234.

With reference to FIG. 7, the camshaft 226 is shown in a final state where the first set of lobe members 238 and the bearing journals 262 are fixed for rotation with the first shaft 234. In the final state, the first radial outer surface 288 of the first shaft 234 and the third radial outer surface 296 of the first shaft 234 may each have an outward radial extent that is greater than an outward radial extent of the second radial outer surface 292 of the first shaft 234. The outward radial extent of the first radial outer surface 288 may be generally similar to the outer radial extent of the bore 298 of the lobe member 238 and the outward radial extent of the third radial outer surface 296 may be generally similar to the outer radial extent of the bore 302 of the bearing journal 262. Therefore, the lobe member 238 may be frictionally engaged with the first portion 280 of the first shaft 234 and the bearing journal 262 may be frictionally engaged with the third portion 284 of the first shaft 234.

For example, the first portion 280 may have a final inner diameter ($D11i_f$) and a final outer diameter ($D11o_f$), the second portion 282 may have a final inner diameter ($D22i_f$) and a final outer diameter ($D22o_f$), and the third portion 284 may have a final inner diameter ($D33i_f$) and a final outer diameter ($D33o_f$). The bore 298 of the lobe member 238 may have a first diameter ($D11$) that is approximately equal to the final outer diameter ($D11o_f$) of the first portion 280, frictionally locking the lobe member 238 for rotation with the first shaft 234. The bore 300 of the lobe member 254 may have a second diameter ($D22$) that is greater than the final outer diameter ($D22o_f$) of the second portion 282. The final outer diameter ($D22o_f$) of the second portion 282 may be approximately equal to the initial outer diameter ($D22o_i$) of the second portion 282, maintaining the second clearance ($C_{22}$) between the first shaft 234 and the lobe member 254. The bore 302 of the journal bearing 262 may have a third diameter ($D33$) that is approximately equal to the final outer diameter ($D33o_f$) of the third portion 284 frictionally locking the bearing journal 262 for rotation with the first shaft 234. The final inner diameter ($D11i_f$) of the first portion 280 and the final inner diameter ($D33i_f$) of the third portion 284 may be greater than the initial inner diameter ($D11i_i$) of the first portion 280 and initial inner diameter ($D33i_i$) of the third portion 284 due to the deformation caused by the pressurized fluid.

What is claimed is:

1. A camshaft comprising:
   a first shaft formed as a one-piece tubular member and including an annular wall defining a first bore, the wall including a first portion having a first radial outermost surface and a second portion having a second radial outermost surface that is radially offset relative to the first radial outermost surface;
   a first lobe member defining a second bore having the first portion of the first shaft located therein and frictionally engaged with the first shaft for rotation with the first shaft; and
   a second lobe member defining a third bore having the second portion of the first shaft located therein, the second lobe member being rotatably disposed on the second portion of the first shaft.

2. The camshaft of claim 1, wherein the first portion of the first shaft has a wall thickness that is greater than a wall thickness of the second portion of the first shaft.

3. The camshaft of claim 1, wherein the second portion of the first shaft has a wall thickness that is greater than a wall thickness of the first portion of the first shaft.

4. The camshaft of claim 1, wherein the first radial outer surface of the first portion is offset radially outwardly relative to the second radial outer surface of the second portion.

5. The camshaft of claim 1, wherein a first radial inner surface of the first portion is offset radially inwardly relative to a second radial inner surface of the second portion.

6. The camshaft of claim 1, wherein a first radial inner surface of the first portion is offset radially outwardly relative to a second radial inner surface of the second portion.

7. The camshaft of claim 1, further comprising a second shaft that is rotatably disposed within the first bore, the second lobe member being fixed for rotation with the second shaft.

8. The camshaft of claim 7, further comprising a third lobe member located on and fixed for rotation with the first shaft, the second lobe member being located axially between the first and third lobe members.

9. An engine assembly comprising:
   an engine structure;
   a first valve lift mechanism supported on the engine structure;
   a second valve lift mechanism supported on the engine structure; and
   a camshaft including:
      a first shaft formed as a one-piece tubular member and including an annular wall defining a first bore, the wall including a first portion having a first radial outermost surface and a second portion having a second radial outermost surface that is radially offset relative to the first radial outermost surface;
      a first lobe member engaged with the first valve lift mechanism, the first lobe member defining a second bore having the first portion of the first shaft located therein and frictionally engaged with the first shaft for rotation with the first shaft; and
      a second lobe member engaged with the second valve lift mechanism, the second lobe member defining a third bore having the second portion of the first shaft located therein, the second lobe member being rotatably disposed on the second portion of the first shaft.

10. The engine assembly of claim 9, wherein the first portion of the first shaft has a wall thickness that is greater than a wall thickness of the second portion of the first shaft.

11. The engine assembly of claim 9, wherein the second portion of the first shaft has a wall thickness that is greater than a wall thickness of the first portion of the first shaft.

12. The engine assembly of claim 9, wherein the first radial outer surface of the first portion is offset radially outwardly relative to the second radial outer surface of the second portion.

13. The engine assembly of claim 9, wherein a first radial inner surface of the first portion is offset radially inwardly relative to a second radial inner surface of the second portion.

14. The engine assembly of claim 9, wherein a first radial inner surface of the first portion is offset radially outwardly relative to a second radial inner surface of the second portion.

15. The engine assembly of claim 9, further comprising a second shaft that is rotatably disposed within the first bore, the second lobe member being fixed for rotation with the second shaft.

16. The engine assembly of claim 15, further comprising a third lobe member located on and fixed for rotation with the first shaft, the second lobe member being located axially between the first and third lobe members.

17. An engine assembly comprising:
an engine structure;
a first valve lift mechanism supported on the engine structure;
a second valve lift mechanism supported on the engine structure; and
a camshaft including:
- a first shaft formed as a one-piece tubular member and including an annular wall defining a first bore, the wall including a first portion defining a first wall thickness and having a first radial outermost surface and a second portion defining a second wall thickness different than the first wall thickness and having a second radial outermost surface;
- a first lobe member engaged with the first valve lift mechanism, the first lobe member defining a second bore having the first portion of the first shaft defining the first wall thickness located therein and frictionally engaged with the first shaft for rotation with the first shaft; and
- a second lobe member engaged with the second valve lift mechanism, the second lobe member defining a third bore having the second portion of the first shaft defining the second wall thickness located therein, the second lobe member being rotatably disposed on the second portion of the first shaft.

18. The engine assembly of claim 17, wherein the first wall thickness is greater than the second wall thickness.

19. The engine assembly of claim 17, wherein the first wall thickness is less than the second wall thickness.

20. The engine assembly of claim 17, further comprising a second shaft that is rotatably disposed within the first bore, the second lobe member being fixed for rotation with the second shaft.

* * * * *